United States Patent [19]
Borum

[11] 3,842,998
[45] Oct. 22, 1974

[54] BOAT TRAILER
[75] Inventor: Otis C. Borum, Jacksonville, Fla.
[73] Assignee: Farenwald Enterprises, Inc., Lancaster, Pa.
[22] Filed: May 14, 1973
[21] Appl. No.: 359,891

[52] U.S. Cl. .................. 214/84, 9/1 T, 193/35 A, 280/414 R
[51] Int. Cl. ............................................ B60p 3/10
[58] Field of Search .................. 214/84, 505, 506; 280/414 R; 9/1 T; 193/35 A, 38, 40, 41, 42

[56] References Cited
UNITED STATES PATENTS

| | | | |
|---|---|---|---|
| 2,925,927 | 2/1960 | Smith | 214/84 |
| 3,225,945 | 12/1965 | Yoder | 214/84 |
| 3,339,762 | 9/1967 | Fox | 214/84 |
| 3,455,472 | 7/1969 | Rankin | 214/84 |
| 3,547,285 | 12/1970 | Plummer | 214/84 |
| 3,709,178 | 1/1973 | Piker et al. | 9/1 T |

Primary Examiner—Robert J. Spar
Assistant Examiner—Leslie J. Paperner
Attorney, Agent, or Firm—Holman & Stern

[57] ABSTRACT

A boat trailer designed for supporting and carrying a boat having longitudinally extending grooves formed in its hull. The trailer includes longitudinally extending upstanding rail members for engaging the grooves in the hull of the boat, and a plurality of rollers for supporting the keel of the boat, the upper surfaces of the rail members being vertically raised with respect to the upper surfaces of the rollers. The relative vertical distance between the upper surfaces of the rail members and the upper surfaces of the keel supporting rollers gradually and uniformly increases from the rear end of the trailer toward the front end thereof. The rear end of the trailer is provided with a pair of centering rollers for facilitating proper lateral positioning of the front end of the boat with respect to the trailer at the start of retrieval of the boat onto the trailer.

13 Claims, 7 Drawing Figures

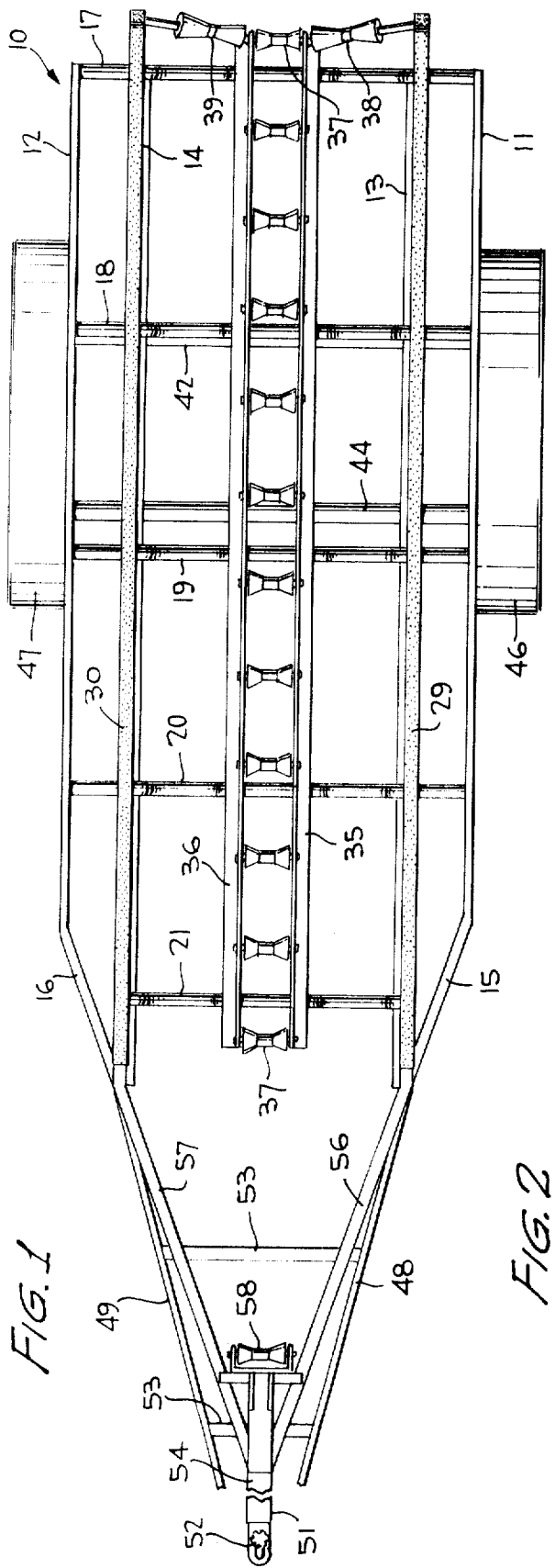
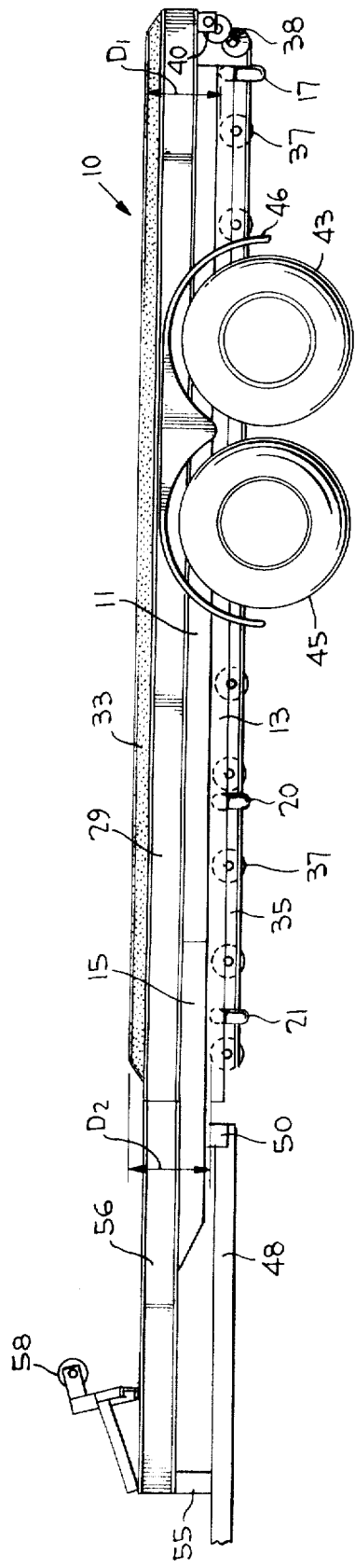
FIG.1
FIG.2

PATENTED OCT 22 1974 3,842,998

BOAT TRAILER

The present invention relates to boat trailers of the type which are adapted to be coupled to the rear of an automobile by means of a hitch for the purpose of transporting a boat from one place to another.

In the Piker et al, U.S. Pat. No. 3,709,178, issued Jan. 9, 1973, there is disclosed a boat, such as a houseboat, having longitudinally extending grooves or slots formed in the hull thereof to improve the stability of the boat on rough water. Also disclosed is a boat trailer particularly designed for transporting such a boat on land. As shown in the patent, the trailer is provided with a pair of longitudinally extending upstanding rail members which engage the grooves in the hull of the boat for maintaining the boat laterally centered on the trailer. The present invention relates to improvements in trailers of this type.

It is an object of this invention to provide a boat trailer of the type described above wherein launching of a boat therefrom and retrieval of a boat thereonto are greatly facilitated.

Another object of this invention is to provide a boat trailer of the type described above which holds a boat in secure and stable engagement therewith while being transported.

A further object of this invention is to provide a boat trailer of the type described above which includes means for facilitating lateral centering of the boat with respect to the trailer and lateral alignment of the grooves in the hull of the boat with the upstanding rail members of the trailer at the start of retrieval of the boat thereonto.

The foregoing objects are achieved in accordance with the present invention by providing a boat trailer having a plurality of rollers extending longitudinally along the central portion of its frame for supporting the keel of a boat, and a pair of upstanding rail members extending longitudinally along the frame substantially parallel to and on opposite sides of the keel supporting rollers for engaging the grooves in the hull of the boat. The upper surfaces of the rail members are vertically raised relative to the upper surfaces of the keel supporting rollers, with the relative vertical distance between the upper surfaces of the rail members and the upper surfaces of the keel supporting rollers gradually and uniformly increasing from the rear end of the trailer toward the front end thereof. This construction enables launching of the boat from the trailer and retrieval of the boat onto the trailer with minimal frictional resistance between the rail members of the trailer and the hull of the boat, while at the same time effecting a wedging of the forward portion of the hull of the boat onto the rail members of the trailer as the boat is advanced forward during retrieval, thereby providing secure engagement of the boat and trailer during transporting thereof. The rear end of the trailer is also provided with a pair of centering rollers disposed on opposite sides of the rearmost keel supporting roller and inclined downwardly toward the keel supporting roller. At the start of retrieval of the boat onto the trailer, the centering rollers serve to laterally center the front end of the boat with respect to the trailer so as to effect lateral alignment of the keel of the boat with the bed of keel supporting rollers of the trailer and lateral alignment of the grooves in the hull of the boat with the rail members of the trailer.

The invention will be more readily understood from a reading of the following description in conjunction with the accompanying drawings, wherein an example of the invention is shown, and wherein:

FIG. 1 is a top plan view of a boat trailer constructed in accordance with the invention;

FIG. 2 is a side elevational view of the trailer;

Figure 5:
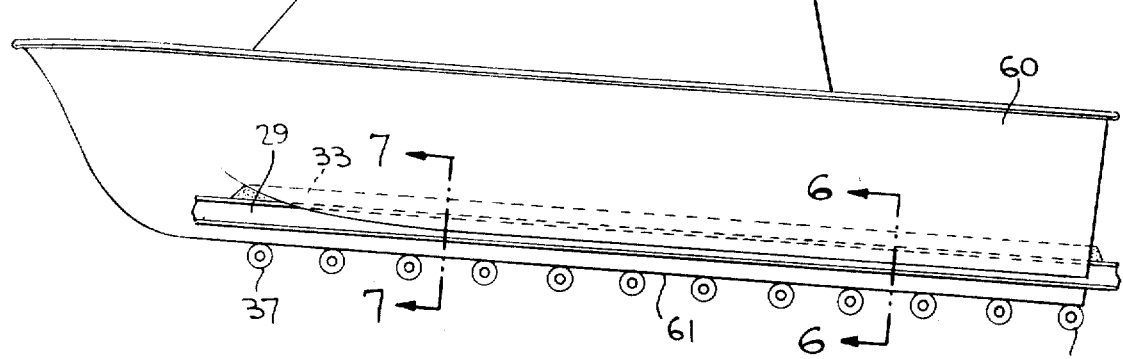
FIG. 5 is a side elevational view of the trailer showing a boat fully retrieved thereon.
Figure 6:
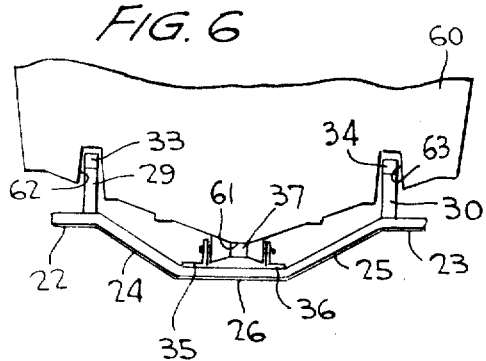
Figure 7:
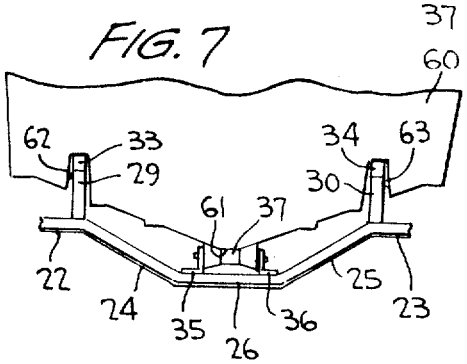

FIG. 6 is a transverse cross-sectional view taken substantially along the line 6—6 of FIG. 5 showing a slight space between the upper surfaces of the rail members of the trailer and the bottom of the grooves in the hull of the boat; and FIG. 7 is a transverse cross-sectional view taken substantially along the line 7—7 of FIG. 5 showing the grooves in the hull of the boat fully seated on the rail members of the trailer.

Figure 3:
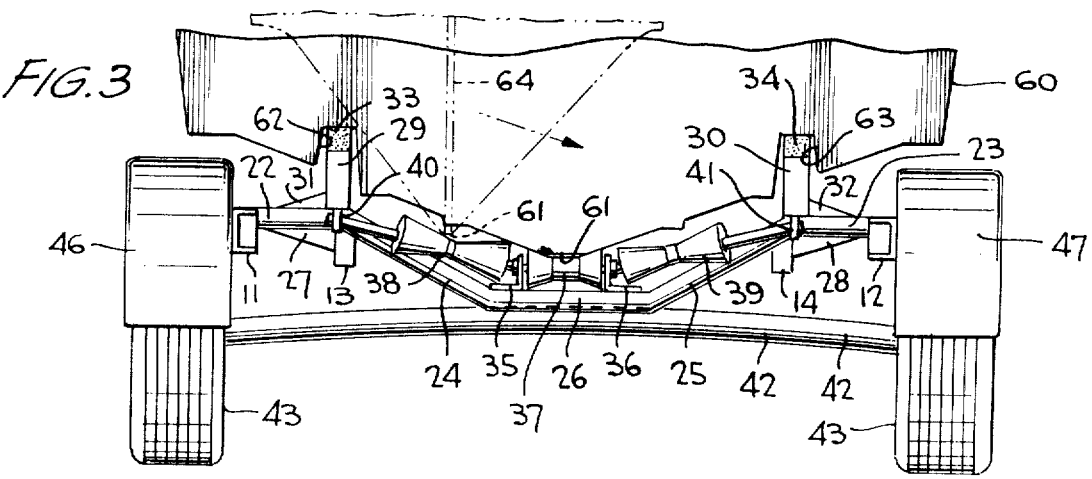
FIG. 3 is a rear elevational view of the trailer having a boat supported thereon, and illustrating in broken lines the forward end of the boat entering the rear end of the trailer on one of the centering rollers thereof at the start of retrieval.

In the drawings, the numeral 10 designates the frame of a boat trailer in accordance with the present invention, which includes a pair of horizontal, longitudinally extending outer frame members or channels 11 and 12 and a pair of horizontal, longitudinally extending inner frame members of channels 13 and 14. The outer frame members 11 and 12 have forward portions 15 and 16, respectively, which are bent inwardly to converge with and extend beyond the forward ends of the inner frame members 13 and 14, respectively. The outer frame members 11 and 12 and the inner frame members 13 and 14 are connected in parallel, spaced relationship by transversely extending, parallel cross members 17, 18, 19, 20 and 21. As best shown in FIG. 3, the cross members include upper horizontal outer portions 22 and 23, downwardly and inwardly inclined intermediate portions 24 and 25, and lower horizontal central portions 26. The upper horizontal outer portions 22 extend between the outer frame member 11 and the inner frame member 13, the upper horizontal outer portions 23 extend between the outer frame member 12 and the inner frame member 14, and the intermediate portions 24 and 25 and the central portions 26 extend between the two inner frame members 13 and 14. As shown in FIG. 1, the forwardmost cross member 21, which is positioned forwardly of the point where the outer frame members 11 and 12 are bent inwardly, does not extend to the outer frame members 11 and 12 but merely extends between the two inner frame members 13 and 14. As shown in FIG. 3, the inner frame members 13 and 14 extend downwardly from the cross members and are braced thereto by bracing members 27 and 28, respectively.

A pair of upstanding rail members 29 and 30 extend longitudinally along the frame in parallel, spaced relationship from a point immediately rearward of the rearmost cross member 17 to the point where the forward portions 15 and 16 of the outer frame members 11 and 12, respectively, converge with the forward ends of the inner frame members 13 and 14, respectively. The rail members 29 and 30 are attached to and extend upwardly from the cross members 17, 18, 19, 20 and 21. As best seen in FIG. 3, the rail member 29 substantially overlies the inner frame member 13, being vertically spaced therefrom by means of the cross members, and is attached to the upper horizontal outer portions 22 of the cross members and braced thereto by bracing members 31. Similarly, the rail member 30 substantially overlies the inner frame member 14, being vertically spaced therefrom by means of the cross members, and is attached to the upper horizontal outer portions 23 of the cross members and braced thereto by bracing members 32. The rail members 29 and 30 are provided with cushioned upper surfaces by means of continuous soft cushioning members 33 and 34, respectively, attached thereto.

Intermediate the two rail members 29 and 30, a pair of roller supporting and journaling bracket members 35 and 36 extend longitudinally along the central portion of the frame in parallel, spaced relationship with each other and with the rail members 29 and 30, from a point immediately rearward of the rearmost cross member 17 to a point immediately forward of the forwardmost cross member 21. As best seen in FIG. 3, the bracket members 35 and 36 are attached to the lower horizontal central portions 26 of each of the cross members 17, 18, 19, 20 and 21, and extend upwardly therefrom, vertically below the rail members 29 and 30.

Figure 4:
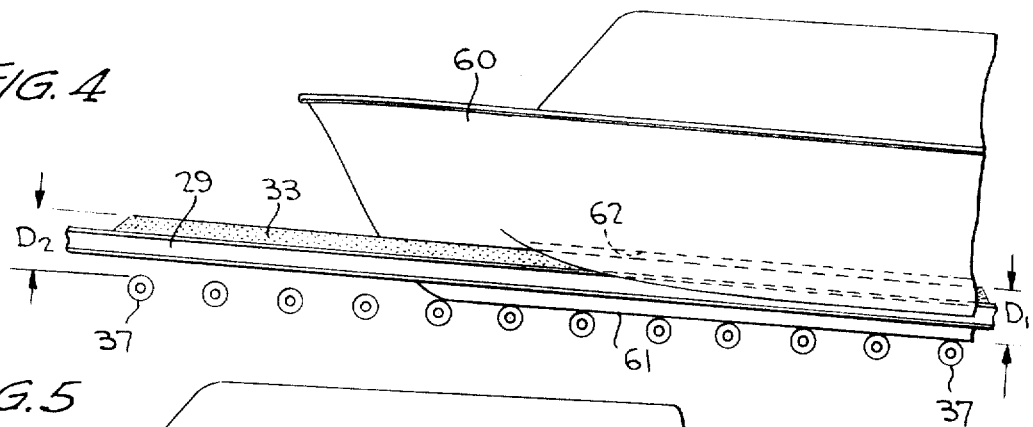
FIG. 4 is a fragmentary side elevational view of the trailer showing a boat partially retrieved thereon.

A plurality of keel supporting rollers 37 are supported and journaled between and bracket members 35 and 36. The keel supporting rollers 37 are substantially equally spaced and aligned longitudinally along the frame from the rear ends to the forward ends of the bracket members 35 and 36. Although twelve such keel supporting rollers 37 are illustrated in the drawings, it will be understood that the number of rollers may be varied from that shown, depending upon the length of the trailer. The keel supporting rollers 37, whose upper surfaces are well below the upper surfaces of the rail members 29 and 30, are journaled between the bracket members 35 and 36 in such a manner that the vertical distance between the upper surfaces of the rail members 29 and 30 and the upper surfaces of the keel supporting rollers 37 gradually and uniformly increases from a distance $D_1$ at the rearmost keel supporting roller 37 to a distance $D_2$ at the forwardmost keel supporting roller 37, as indicated in FIGS. 2 and 4. $D_2$ is only slightly greater than $D_1$, for example, on the order of about one inch over a longitudinal span of approximately 18 feet. The difference between $D_2$ and $D_1$, is evenly divided over the entire bed of keel supporting rollers 37, for example, by having each succeeding keel supporting roller 37 journaled between the bracket members 35 and 36 at a very slightly reduced height relative to the keel supporting roller 37 immediately to the rear thereof.

A pair of elongated centering rollers 38 and 39 are disposed immediately adjacent to and on opposite sides of the rearmost keel supporting roller 37 in a downwardly inclined position toward the keel supporting roller 37 such that the sloping upper surfaces of the centering rollers 38 and 39 lead onto the upper surface of the keel supporting roller 37. The centering roller 38 is supported and journaled between the bracket member 35 and a bracket member 40 which is attached to and extends downwardly from the rear end of the rail member 29. The centering roller 39 is supported and journaled between the bracket member 36 and a bracket member 41 which is attached to and extends downwardly from the rear end of the rail member 30.

An axle 42 having a pair of rubber-tired wheels 43 and an axle 44 having a pair of rubber-tired wheels 45 extend transversely across the frame below and between the cross members 18 and 19 and are suspended from the outer frame members 11 and 12 in the usual manner, as by suitable spring assemblies, not shown. The wheels may be encased at their upper ends by mudguards 46 and 47 attached to the outer frame members 11 and 12, respectively, by suitable brackets, not shown.

At the front end of the trailer, a pair of leg members 48 and 49 are attached to and below the forward portions 15 and 16, respectively, of the outer frame members 11 and 12, respectively, by brackets 50. The leg members 48 and 49 extend forwardly beyond the front ends of portions 15 and 16, angled toward each other, and are joined at their front ends by means of a towbar 51, welded or otherwise secured thereto, having a hitch 52 for coupling the trailer to the rear of an automobile. The leg members 48 and 49 are also joined together intermediate their ends by a plurality of cross bars 53 which also serve to support a longitudinal member 54 which in turn supports an upstanding post 55.

The rail members 29 and 30 are provided at their front ends with tongue-like forward extensions 56 and 57, respectively, which are bent inwardly so as to overlie the forward portions 15 and 16, respectively, of the outer frame members 11 and 12, respectively. The extensions 56 and 57 extend forwardly beyond the front ends of portions 15 and 16 and converge with the upstanding post 55 by being welded or otherwise secured thereto. The front ends of the extensions 56 and 57, adjacent to their point of convergence, serve as a platform for supporting a winch 58 provided with a towing cable, not shown, to aid in retrieving a boat onto the trailer, securing the boat to the trailer during transport, and launching the boat from the trailer.

As illustrated in FIGS. 3–7, the boat trailer in accordance with the present invention is adapted to receive and have supported thereon a boat 60 having a longitudinally extending central keel 61 and a pair of longitudinally extending grooves or slots 62 and 63 formed in its hull. Such boats are fully described in the Piker et al, U.S. Pat. No. 3,709,178, issued Jan. 9, 1973. The keel supporting rollers 37 of the trailer are adapted to support the keel 61 of the boat along its length, and the rail members 29 and 30 of the trailer are adapted to engage the grooves 62 and 63, respectively, in the hull of the boat so as to maintain the boat laterally centered on the trailer.

Boats of this type typically have their front end or bow terminating in a prow 64 having a deep V-shaped configuration, as shown by the broken lines in FIG. 3, with the grooves 62 and 63 in the hull starting at a point somewhat rearwardly of the prow. At the start of retrieval of the boat onto the trailer, the centering rollers 38 and 39 on the rear end of the trailer, in accordance with one aspect of the present invention, provide a quick and effective means for properly positioning the boat laterally with respect to the trailer so that the keel 61 of the boat will be laterally aligned with the keel supporting rollers 37 of the trailer, and the grooves 62 and 63 in the hull of the boat will be laterally aligned with the rail members 29 and 30, respectively, of the trailer. For example; as shown by the broken lines in FIG. 3, if at the start of retrieval the front end of the boat 60 enters the rear end of the trailer on the centering roller 38, the downwardly and inwardly sloping upper surface of the centering roller 38 will guide the front end of the boat in the direction of the arrow so that it will settle down onto the rearmost keel supporting roller 37. Thereafter, as retrieval continues, the keel 61 of the boat will be in lateral alignment with the bed of keel supporting rollers 37 of the trailer, and the grooves 62 and 63 in the hull of the boat will be in lateral alignment with the rail members 29 and 30, respectively, of the trailer.

As pointed out above, another important aspect of the present invention is the relative positioning on the trailer of the rail members 29 and 30 and the keel supporting rollers 37, such that the vertical distance between the upper surfaces of the rail members 29 and 30 and the upper surfaces of the keel supporting rollers 37 gradually and uniformly increases from a distance $D_1$ at the rearmost keel supporting roller 37 to a distance $D_2$ at the forwardmost keel supporting roller 37. The distance $D_1$ is such that with the keel 61 of the boat seated on the keel supporting rollers 37 of the trailer, a space or clearance will exist between the upper surfaces of the rail members 29 and 30 of the trailer and the bottom surfaces of the grooves 62 and 63, respectively, in the hull of the boat. The distance $D_2$ is such that with the keel 61 of the boat seated on the keel supporting rollers 37 of the trailer, the bottom surfaces of the grooves 62 and 63 in the hull of the boat will be snugly wedged against the cushioned upper surfaces of the rail members 29 and 30, respectively, of the trailer. The clearance between the upper surfaces of the rail members 29 and 30 of the trailer and the bottom surfaces of the grooves 62 and 63, respectively, in the hull of the boat, although gradually diminishing with forward advancement from the rear end of the trailer, is still present to some extent over a substantial portion of the length of the trailer. Hence, with the boat 60 in the partially retrieved position shown in FIG. 4, about halfway retrieved onto the trailer, a very slight clearance exists between the upper surfaces of the rail members 29 and 30 of the trailer and the bottom surfaces of the forward portion of the grooves 62 and 63, respectively, in the hull of the boat, and no frictional resistance between these surfaces will as yet have been encountered.

As the boat 60 is advanced forwardly on the trailer from the partially retrieved position shown in FIG. 4 to the fully retrieved position shown in FIG. 5, the bottom surfaces of the forward portion of the grooves 62 and 63 in the hull of the boat will gradually become fully seated on, and finally snugly wedged against, the cushioned upper surfaces of the rail members 29 and 30, respectively, of the trailer. With the boat fully retrieved and supported on the trailer, the bottom surfaces of the grooves 62 and 63 in the hull of the boat are spaced from the cushioned upper surfaces of the rail members 29 and 30, respectively, of the trailer toward the rear end of the grooves, as shown in FIG. 6; fully seated thereon toward the forward end of the grooves, as shown in FIG. 7; and snugly wedged thereagainst at the far front end of the grooves.

The construction of the present invention, providing a clearance between the upper surfaces of the rail members of the trailer and the bottom surfaces of the grooves in the hull of the boat over a substantial portion of the length of the trailer, enables the boat to be retrieved onto and launched from the trailer with minimal frictional resistance between these surfaces, thereby greatly facilitating these operations. At the same time, the wedging effect between these surfaces at their front ends, provided by the construction of the present invention, results in a secure and stable engagement of the boat onto the trailer for the purpose of transporting the same on a highway.

What is claimed is:

1. A boat trailer including a frame having a rear end and a front end, keel supporting means disposed on said frame and extending longitudinally along the central portion of said frame from said rear end toward said front end, and a pair of upstanding rail members disposed on said frame and extending longitudinally along said frame substantially parallel to and on opposite sides of said keel supporting means, the upper surfaces of said rail members being vertically raised relative to the upper surface of said keel supporting means, the relative vertical distance between said upper surfaces of said rail members and said upper surface of said keel supporting means gradually and uniformly increasing from said rear end of said frame toward said front end of said frame.

2. The boat trailer as set forth in claim 1 wherein said keel supporting means includes a plurality of longitudinally aligned rollers.

3. The boat trailer as set forth in claim 2 wherein said keel supporting rollers are supported and journaled between a pair of bracket members disposed on said frame and extending longitudinally along said frame vertically below said rail members.

4. The boat trailer as set forth in claim 3 wherein said keel supporting rollers are substantially equally spaced longitudinally along said frame and each succeeding keel supporting roller is journaled between said bracket members at a reduced height relative to the keel supporting roller immediately to the rear thereof.

5. The boat trailer as set forth in claim 1 including a pair of centering members disposed on said rear end of said frame on opposite sides of said keel supporting means, each of said centering members having upper surfaces sloping downwardly toward and leading onto said upper surface of said keel supporting means.

6. The boat trailer as set forth in claim 5, wherein said centering members are inclined elongated rollers.

7. A boat trailer adapted to support a boat having a longitudinal keel and a pair of longitudinally extending grooves formed along the length of the hull thereof, said trailer including a frame having a rear end and a front end, keel supporting means disposed on said frame and extending longitudinally along the central portion of said frame from said rear end toward said front end, and a pair of upstanding rail members disposed on said frame and extending longitudinally along said frame substantially parallel to and on opposite sides of said keel supporting means, said rail members being adapted to engage said grooves in the hull of said boat, the upper surfaces of said rail members being vertically raised relative to the upper surface of said keel supporting means, the relative vertical distance between said upper surfaces of said rail members and said upper surface of said keel supporting means gradually and uniformly increasing from a distance $D_1$ at said rear end of said frame to a distance $D_2$ toward said front end of said frame, the distance $D_1$ being such that with said keel of said boat seated on said upper surface of said keel supporting means of said trailer the bottom surfaces of said grooves in the hull of said boat will be spaced from said upper surfaces of said rail members, the distance $D_2$ being such that with said keel of said boat seated on said upper surface of said keel supporting means of said trailer the bottom surfaces of said grooves in the hull of said boat will be snugly wedged against said upper surfaces of said rail members.

8. The boat trailer as set forth in claim 7 wherein said keel supporting means includes a plurality of longitudinally aligned rollers.

9. The boat trailer as set forth in claim 8 wherein said keel supporting rollers are supported and journaled between a pair of bracket members disposed on said frame and extending longitudinally along said frame vertically below said rail members 10. The boat trailer as set forth in claim 9 wherein said keel supporting rollers are substantially equally spaced longitudinally along said frame and each succeeding keel supporting roller is journaled between said bracket members at a reduced height relative to the keel supporting roller immediately to the rear thereof.

11. The boat trailer as set forth in claim 7 including a pair of centering members disposed on said rear end of said frame on opposite sides of said keel supporting means, each of said centering members having upper surfaces sloping downwardly toward and leading onto said upper surface of said keel supporting means.

12. The boat trailer as set forth in claim 11 wherein said centering members are inclined elongated rollers.

13. The boat trailer as set forth in claim 7 wherein said rail members have cushioned upper surfaces.

* * * * *